United States Patent

Mehra et al.

(10) Patent No.: US 10,452,445 B2
(45) Date of Patent: Oct. 22, 2019

(54) DYNAMICALLY CONFIGURABLE STORAGE CLUSTERS

(71) Applicant: Microsoft Technology Licensing, LLC, Redmond, WA (US)

(72) Inventors: Karan Mehra, Sammamish, WA (US); Emanuel Paleologu, Kirkland, WA (US); Vinod R. Shankar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/691,574

(22) Filed: Aug. 30, 2017

(65) Prior Publication Data

US 2019/0004860 A1    Jan. 3, 2019

Related U.S. Application Data (60) Provisional application No. 62/526,196, filed on Jun. 28, 2017.

(51) Int. Cl.
*G06F 9/50* (2006.01)
*G06F 16/22* (2019.01)

(52) U.S. Cl.
CPC ............ *G06F 9/5016* (2013.01); *G06F 9/505* (2013.01); *G06F 16/22* (2019.01)

(58) Field of Classification Search
CPC ...................................................... G06F 9/5016
See application file for complete search history.

(56) References Cited

U.S. PATENT DOCUMENTS

| | | | |
|---|---|---|---|
| 6,173,306 B1* | 1/2001 | Raz ........................ | G06F 9/5083 718/102 |
| 7,290,168 B1 | 10/2007 | DeKoning | |
| 2005/0038834 A1 | 2/2005 | Souder et al. | |
| 2013/0067188 A1 | 3/2013 | Mehra et al. | |
| 2016/0292025 A1* | 10/2016 | Gupta .................... | G06F 11/076 |
| 2017/0046363 A1* | 2/2017 | Morita .................... | G06F 17/30 |
| 2018/0232162 A1* | 8/2018 | Bode .................... | G06F 12/0862 |

OTHER PUBLICATIONS

ESX Server, et al., "Setup for Microsoft Cluster Service", Retrieved from https://www.vmware.com/pdf/vi3_30_20_mscs.pdf, Jun. 15, 2006, 58 Pages.

"International Search Report and Written Opinion Issued in PCT Application No. PCT/US2018/033995", dated Nov. 22, 2018, 14 Pages.

* cited by examiner

*Primary Examiner* — Charlie Sun
(74) *Attorney, Agent, or Firm* — Newport IP, LLC; Tim R. Wyckoff (57) ABSTRACT

The techniques disclosed herein provide a dynamically configurable cluster of storage devices. In some configurations, the dynamically configurable cluster is associated with a fault domain. The cluster may include a plurality of computing devices that each include at least a storage device. The plurality of storage devices in the cluster may be configured to support a plurality of workloads coupled to the dynamically configurable cluster. The plurality of storage devices in the dynamically configurable cluster may be allocated to one or more of the plurality of workloads based on metadata identified resiliency requirements, performance requirements, and/or cost factors linked to the one or more of the plurality of workloads.

20 Claims, 7 Drawing Sheets

DYNAMICALLY CONFIGURABLE STORAGE CLUSTERS

RELATED APPLICATION

This application claims the benefit of and priority to U.S. Provisional Application No. 62/526,196 filed Jun. 28, 2017, the entire contents of which are incorporated herein by reference.

BACKGROUND

Computer systems often utilize some type of non-volatile data storage. For example, computer systems may have multiple storage devices, such as one or more hard drives, solid state drives, etc. When multiple storage devices are used, they can be arranged in various ways to provide certain levels of resiliency. Different levels of resiliency can be achieved by different mirroring schemes or parity schemes. For example, a moderate level of resiliency can be achieved by a mirroring scheme that maintains two copies of data, where the different copies are on one or more different device arrangements. Even more redundancy can be achieved by having three copies of data on three different device arrangements. The first example can tolerate a single device failure while the second example could tolerate two device failures. Alternatively, various parity schemes, such as redundant array of independent disks systems, could be used to obtain resiliency. Parity schemes use less disk space than mirroring schemes, but have lower levels of performance because of the need to perform various computations to create the parity.

When a system designer designs storage for a system, they will typically determine general requirements for the data in the system and configure a storage entity. An entity can be portions of one or more storage devices arranged to appear and function as a particular data storage unit, such as a volume to the system. However, once a storage entity is configured for the system, that storage entity is fixed in its constraints. For example, if so configured, a storage entity will always be simple storage with a fixed capacity, mirrored storage with a certain number of copies, or parity storage with a certain resiliency.

Data may have certain handling requirements that change over time, or different data introduced into the system may have different handling requirements. In particular, data may have certain performance and/or resiliency requirements. Performance requirements are related to how quickly data can be accessed whereas resiliency requirements are related to the ability to maintain data availability in the context of hardware failures or other data access or data loss.

Presently, system designers may have several different storage entities configured to meet different data requirements for data. However, if data requirements change for data, or if new data is introduced into the system having data requirements that differ drastically from that provided by available storage entities, the system designer may need to design and add new storage entities and/or make inefficient use of existing storage entities, such as by storing data in an entity that far exceeds the requirements for the data.

It is with respect to these and other considerations that the disclosure made herein is presented. The subject matter claimed herein is not limited to embodiments that solve any disadvantages or that operate only in environments such as those described above. Rather, this background is only provided to illustrate one exemplary technology area where some embodiments described herein may be practiced.

SUMMARY

The techniques disclosed herein provide a dynamically configurable cluster. In some configurations, the dynamically configurable cluster is associated with a fault domain. The cluster may include a plurality of computing devices that each include at least a storage device. The storage device may be a hard drive, solid-state storage device, or the like. The plurality of storage devices in the cluster may be configured to support a plurality of workloads coupled to the dynamically configurable cluster. For example, the plurality of storage devices in the dynamically configurable cluster may be allocated to one or more of the plurality of workloads based on resiliency requirements, performance requirements (e.g., throughput requirements), and/or cost factors linked to the one or more of the plurality of workloads.

In some implementations, a dynamically configurable cluster may include a plurality of storage devices. A plurality of workloads may be coupled to the dynamically configurable cluster. Each of the plurality of workloads may include associated metadata that identifies a resiliency requirement associated with an associated workload. The dynamically configurable cluster may include a workload handler module that analyzes the metadata and the resiliency requirement associated with each of the plurality of workloads. Based at least on the analysis performed by the workload handler module, a storage device configuration module associated with the dynamically configurable cluster and/or the workload handler module may allocate a plurality storage devices to each of the plurality of workloads. In some implementations, a number of or all of a first plurality of storage devices associated with a first workload may overlap with a number or all of a second plurality of storage devices associated with a second workload.

In some implementations, a dynamically configurable cluster may include a plurality of storage devices. A plurality of workloads may be coupled to the dynamically configurable cluster. Each of the plurality of workloads may include associated metadata that identifies a resiliency requirement and a throughput requirement associated with an associated workload. The dynamically configurable cluster may include a workload handler module that analyzes the metadata and the resiliency and throughput requirements associated with each of the plurality of workloads.

Based at least on the analysis performed by the workload handler module, a storage device configuration module associated with the workload handler module and/or the dynamically configurable cluster may allocate a plurality of storage devices to each of the plurality of workloads. In some implementations, the plurality of storage devices allocated to each of the plurality of workloads is based primarily on the resiliency requirements and secondarily on the throughput requirements. In some implementations, a number of or all of a first plurality of storage devices associated with a first workload may overlap with a number or all of a second plurality of storage devices associated with a second workload.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques disclosed herein provide a dynamically configurable cluster. In some configurations, the dynamically configurable cluster is associated with a fault domain. The cluster may include a plurality of computing devices that each include at least a storage device. The storage device may be a hard drive, solid-state storage device, or the like. The plurality of storage devices in the cluster may be configured to support a plurality of workloads coupled to the dynamically configurable cluster. For example, the plurality of storage devices in the dynamically configurable cluster may be allocated to one or more of the plurality of workloads based on resiliency requirements, performance requirements (e.g., throughput requirements), and/or cost factors linked to the one or more of the plurality of workloads.

In some implementations, a dynamically configurable cluster may include a plurality of storage devices. A plurality of workloads may be coupled to the dynamically configurable cluster. Each of the plurality of workloads may include associated metadata that identifies a resiliency requirement associated with an associated workload. The dynamically configurable cluster may include a workload handler module that analyzes the metadata and the resiliency requirement associated with each of the plurality of workloads. Based at least on the analysis performed by the workload handler module, a storage device configuration module associated with the dynamically configurable cluster and/or the workload handler module may allocate a plurality storage devices to each of the plurality of workloads. In some implementations, a number of or all of a first plurality of storage devices associated with a first workload may overlap with a number or all of a second plurality of storage devices associated with a second workload.

In some implementations, a dynamically configurable cluster may include a plurality of storage devices. A plurality of workloads may be coupled to the dynamically configurable cluster. Each of the plurality of workloads may include associated metadata that identifies a resiliency requirement and a throughput requirement associated with an associated workload. The dynamically configurable cluster may include a workload handler module that analyzes the metadata and the resiliency and throughput requirements associated with each of the plurality of workloads. Based at least on the analysis performed by the workload handler module, a storage device configuration module associated with the workload handler module and/or the dynamically configurable cluster may allocate a plurality of storage devices to each of the plurality of workloads. In some implementations, the plurality of storage devices allocated to each of the plurality of workloads is based primarily on the resiliency requirements and secondarily on the throughput requirements. In some implementations, a number of or all of a first plurality of storage devices associated with a first workload may overlap with a number or all of a second plurality of storage devices associated with a second workload.

Figure 1:
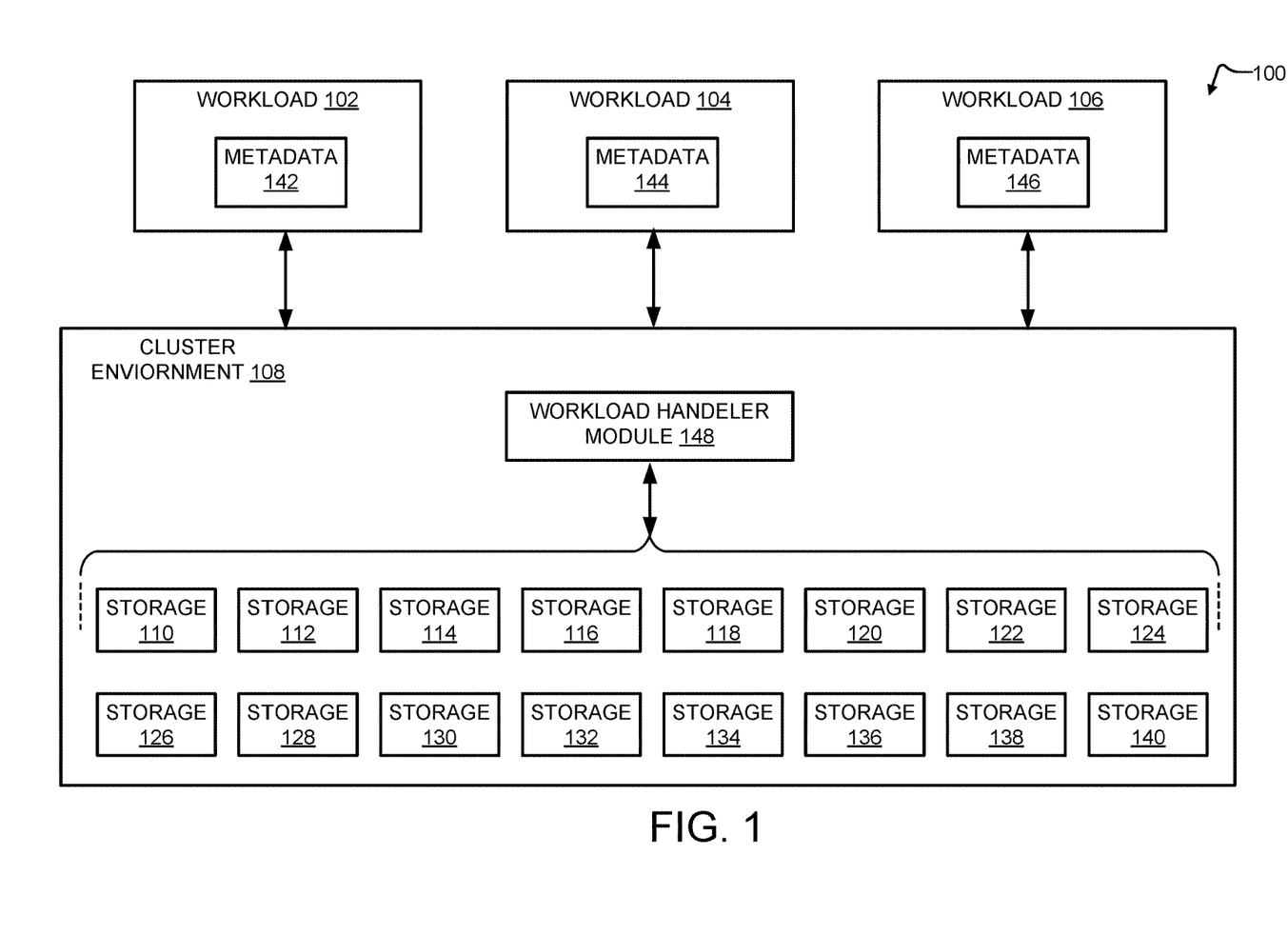
FIG. 1 is a diagram illustrating an example operating environment in which one or more systems may operate to process one or more workloads, thereby facilitated using the disclosed dynamically configurable storage cluster techniques.

FIG. 1 is a diagram illustrating an example operating environment 100 in which one or more systems may operate to process one or more workloads, facilitated using the disclosed dynamically configurable storage cluster techniques. FIG. 1 illustrates that a plurality workloads 102-106 may be coupled to a cluster environment 108.

The term "workload" as used herein typically refers to a client application(s) that is hosted on the cluster environment 108. Such client applications include, but are not limited to, virtual machines, storage and file shares, hosted client applications of any kind, and any combination of the foregoing. Non-limiting examples of some client applications that a client may desired to have hosted on the cluster environment 108 include database applications (e.g., SQL Server), email services, storage services (e.g., archival and backup services), accounting packages, web sites, office suites, and any other software or services or functionality or the like that can be hosted on the cluster environment 108. To be "hosted" means that a client's workload is made operational and available by the cluster environment 108 on behalf of the client and according to the client's requirements.

The cluster environment 108 may include a plurality of storages 110-140. The term "storage" or the like refers to a physical resource such as computing device or the like that is configured as part of the cluster environment 108. Such a storage may execute particular cluster storage software. A cluster environment 108 typically comprises a plurality of such physical cluster storages, some of which may be physically located at one site and others of which may be physically located at one or more other sites. Such physical sites are typically physically and geographically distinct and are referred to herein as "geo-sites." For example, several example storages 110-118 of the cluster environment 108 may be physically located at a geo-site A in Seattle while other example nodes 120-128 of the same cluster environment 108 may be physically located at a geo-site B in Dallas, and so forth. In some implementations, the cluster environment 108 may be considered a "fault domain." In some implementations, a fault domain is a grouping of hardware (rack of resources like servers, power, etc.) in which web, worker and virtual machines are arranged and stored. The cluster environment 108 may be considered to implement one or more fault domains.

The workloads 102-106 may have associated metadata 142-146. Specifically, the workload 102 may have the metadata 142 associated therewith, the workload 104 may have the metadata 144 associated therewith, and the workload 106 may have the metadata 146 associated therewith. In some implementations, each of the metadata 142-146, for its respective workload 102-106, specifies handling parameters that may be considered by the cluster environment 108. For example, each of the metadata 142-146 may specify a resiliency parameter, a performance parameter, and/or a time parameter. The resiliency parameter identifies how many redundant copies of a given workload 102-106 should be stored by the cluster environment 108. The performance parameter identifies a desired amount of throughput or processing needed for a given workload 102-106. The time parameter identifies a timeframe or time duration for processing a given workload 102-106. The metadata 142-146 may include additional handling parameters as well.

In some implementations, one or more of the workloads 102-106 may be processed by the cluster environment 108. Therefore, the cluster environment 108 may include a workload handler module 148. The workload handler module 148 may receive one or more of the workloads 102-106. For example, the workload handler module 148 may receive the workload 102.

The workload handler module 148 may analyze the metadata 142 associated with the workload 102. Specifically, in some nonlimiting implementations, analysis of the metadata 142 may indicate that a resiliency parameter associated with the metadata 142 specifies that data of the workload 102 is to be mirrored or redundantly stored across at least three disparate storage entities. Furthermore, in some nonlimiting implementations, analysis of the metadata 142 may indicate that a performance parameter associated with the metadata 142 specifies that the data of the workload 102 is to be expedited. Generally, the performance parameter may specify one of a plurality of predetermined processing levels known to the cluster environment 108 and the workload handler module 148, such as predetermined processing levels from high to low. Additionally, in some nonlimiting implementations, analysis of the metadata 142 may indicate a time parameter associated with the metadata 142 specifies that the data of the workload 102 is to be processed by the cluster environment 108 and the workload handler module 148 during nighttime hours, daytime hours, a particular range of hours, or for a particular duration. The workload handler 148 may similarly analyze the metadata 144 associated with the workload 104 and/or analyze the metadata 146 associated with the workload 106. Furthermore, if additional workloads are coupled to or will be coupled to the cluster environment 108, those additional workloads may also be similarly processed by the cluster environment 108 and the workload handler module 148.

The workload handler module 148 may use the metadata 142, 144 and/or 146 in determining how many of the storages 110-140 will be allocated to a given workload 102, 104, and/or 106. For example, the workload handler module 148 may analyze the metadata 142 of the workload 102 to determine that the data associated with the workload 102 is to be redundantly stored in three disparate storage entities. Furthermore, analysis of the metadata 142 may indicate that processing of the data associated with the workload 102 is to be performed at a low processing level. Additionally, analysis of the metadata 142 may indicate that the data associated with the workload 102 is to be processed on a daytime schedule (e.g., 6 AM-6 PM). In accordance with the analysis performed by the workload handler module 148, the workload handler module 148 may select, in one example, storages 110-116 to process the data associated with the workload 102. In some implementations, the workload handler module 148 divides the data associated with the workload 102 in order to spread the data consistently, and in accordance with the required redundancy, across the storages 110-116.

In addition to the foregoing, the workload handler module 148 may analyze the metadata 144 of the workload 104 to determine that the data associated with the workload 104 is to be redundantly stored in two disparate storage entities. Furthermore, analysis of the metadata 144 may indicate that processing of the data associated with the workload 104 is to be performed at a medium processing level. Additionally, analysis of the metadata 144 may indicate that the data associated with the workload 104 is to be processed on a daytime schedule (e.g., 6 AM-6 PM). In accordance with the analysis performed by the workload handler module 148, the workload handler module 148 may select, in one example, storages 116-124 to process the data associated with the workload 104. In some implementations, the workload handler module 148 divides the data associated with the workload 104 in order to spread the data consistently, and in accordance with the required redundancy, across the storages 116-124.

Similarly, the workload handler module 148 may analyze the metadata 146 of the workload 106 to determine that the data associated with the workload 104 is to be redundantly stored in at least four disparate storage entities. Furthermore, analysis of the metadata 146 may indicate that processing of the data associated with the workload 106 is to be performed at a high processing level. Additionally, analysis of the metadata 146 may indicate that the data associated with the workload 106 is to be processed on a nighttime schedule (e.g. 6 PM-6 AM) in accordance with the analysis performed by the workload handler module 148, the workload handler module 148 may select, in one example, storages 126-140 to process the data associated with the workload 106. In some implementations, the workload handler module 148 divides the data associated with the workload 104 in order to spread the data consistently, and in accordance with the required redundancy, across the storages 126-140.

As described in the foregoing, the workload handler module 148 allocates the storages 110-116 to at least the workload 102. Furthermore, the workload handler module 148 allocates the storages 116-124 to the workload 104. And, the workload handler module 148 allocates the storages 126-142 the workload 106. Therefore, the workload handler module 148 has allocated at least one common storage (i.e., storage 116) to the workload 102 and 104. In some implementations, the workload handler module 148 functions to optimize the number of storages 110-140 allocated to each workload 102, 104 and/or 106. The metadata (e.g., metadata 142, 144 and/or 146) provides at least some of the information used by the workload handler module 148 to optimize the number of storages 110-140 allocated to each workload 102, 104 and/or 106.

In some implementations, the workload handler module 148 may serially analyze metadata associated with the workloads 102, 104, and/or 106 and serially allocate data associated with the workloads 102, 104, and/or 106 to pluralities of the storages 110-140. In some implementations, the workload handler module 148 may parallelly analyze metadata associated with the workloads 102, 104, and/or 106 and may parallelly allocate data associated with the workloads 102, 104, and/or 106 parallelly to pluralities of the storages 110-140. It may be beneficial to analyze metadata associated with the workloads 102, 104, and/or 106 in parallel before allocating data associated with the workloads 102, 104, and/or 106 to pluralities of the storages 110-140. Specifically, parallel analysis of the metadata associated with the workloads 102, 104, and/or 106 may enable the workload handler module 148 to determine, based on parameters in metadata, that it may be beneficial for some or all of the workloads 102, 104, and/or 106 to share at least one of the storages 110-140. Similarly, parallel analysis of the metadata associated with the workloads 102, 104, and/or 106 may enable the workload handler module 148 to determine, based on parameters in metadata, that it may be beneficial to allocate some or all of the workloads 102, 104, and/or 106 to at least one of the storages 110-140 that is not shared by another workload.

In some implementations, the cluster environment 108 and the workload handler module 148 may periodically analyze the metadata 142-146 of the workloads 102-106 to ascertain if one or more parameters of the metadata 142-146 has changed or otherwise undergone modification. In some implementations, changes or modifications to the metadata 142-146 and the parameters associated therewith may cause the workload handler module 148 to alter or modify a plurality of the storages 110-140 allocated to one or more the workloads 102-106. Initial and periodic analysis of the metadata 142-146 may enable the cluster environment 108 to dynamically allocate pluralities of the storages 110-140 to the workloads 102-106 based on the data processing needs of the workloads 102-106, as defined by the metadata 142-146.

Various exemplary storage allocations for one or more of the workloads 102-106 are described in the following. The cluster environment 108 and/or the workload handler module 148 may provide the described storage allocations for the one or more of the workloads 102-106.

Figure 2:
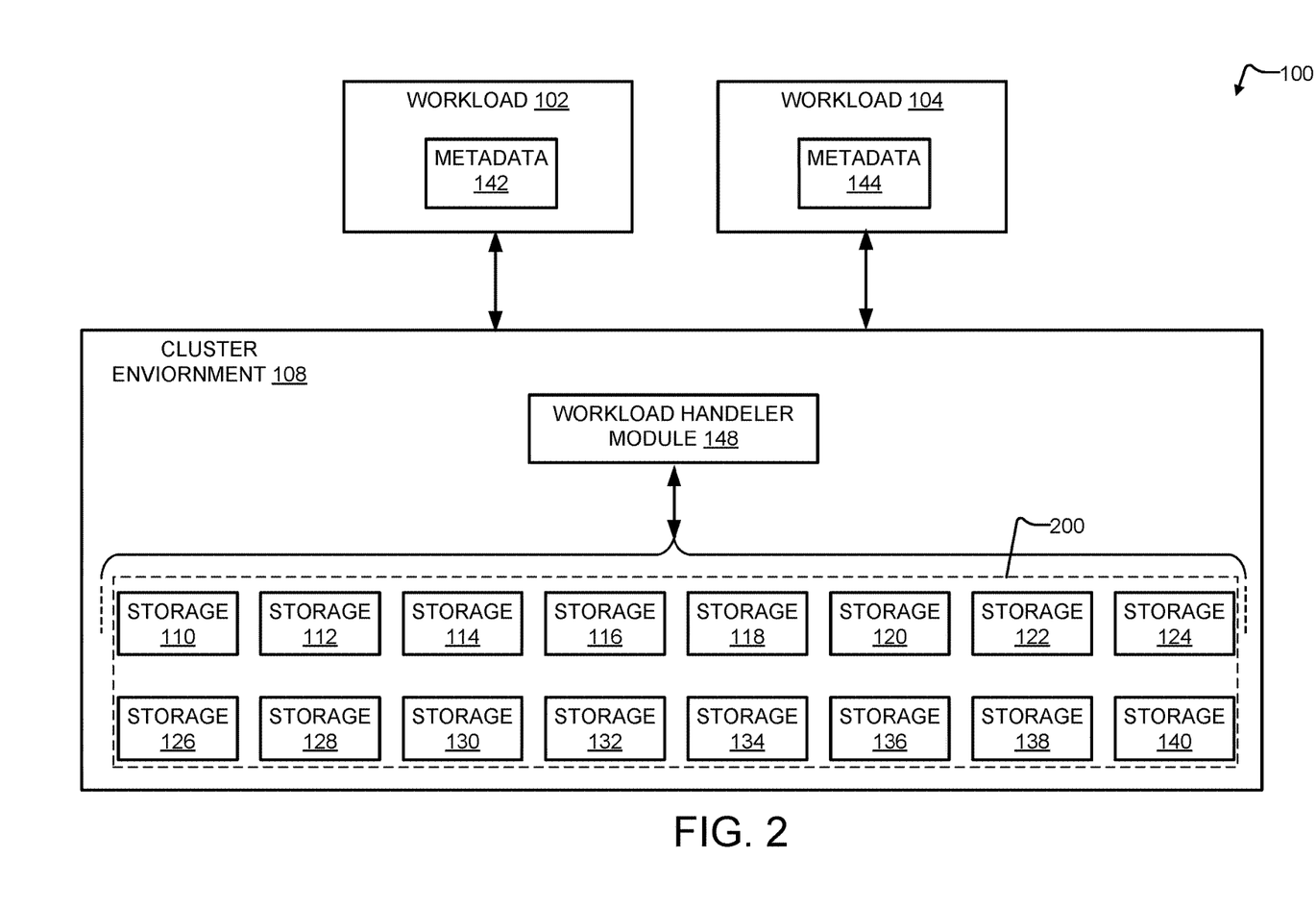
FIG. 2 is a diagram illustrating a dynamic cluster environment configuration, according to the described implementations.

In some implementations, as illustrated in FIG. 2 and shown by a dashed line box 200, data associated with the workloads 102-104 is spread across all the storages 110-140. The data associated with the workloads 102-104 is mirrored or redundantly stored three times within the cluster environment 108 and specifically across the storages 110-140. This arrangement provides excellent performance and space efficiency. However, in this arrangement, a failure of at least three of the storages 110-140 will likely cause the failure of each of the workloads 102-104.

Figure 3:
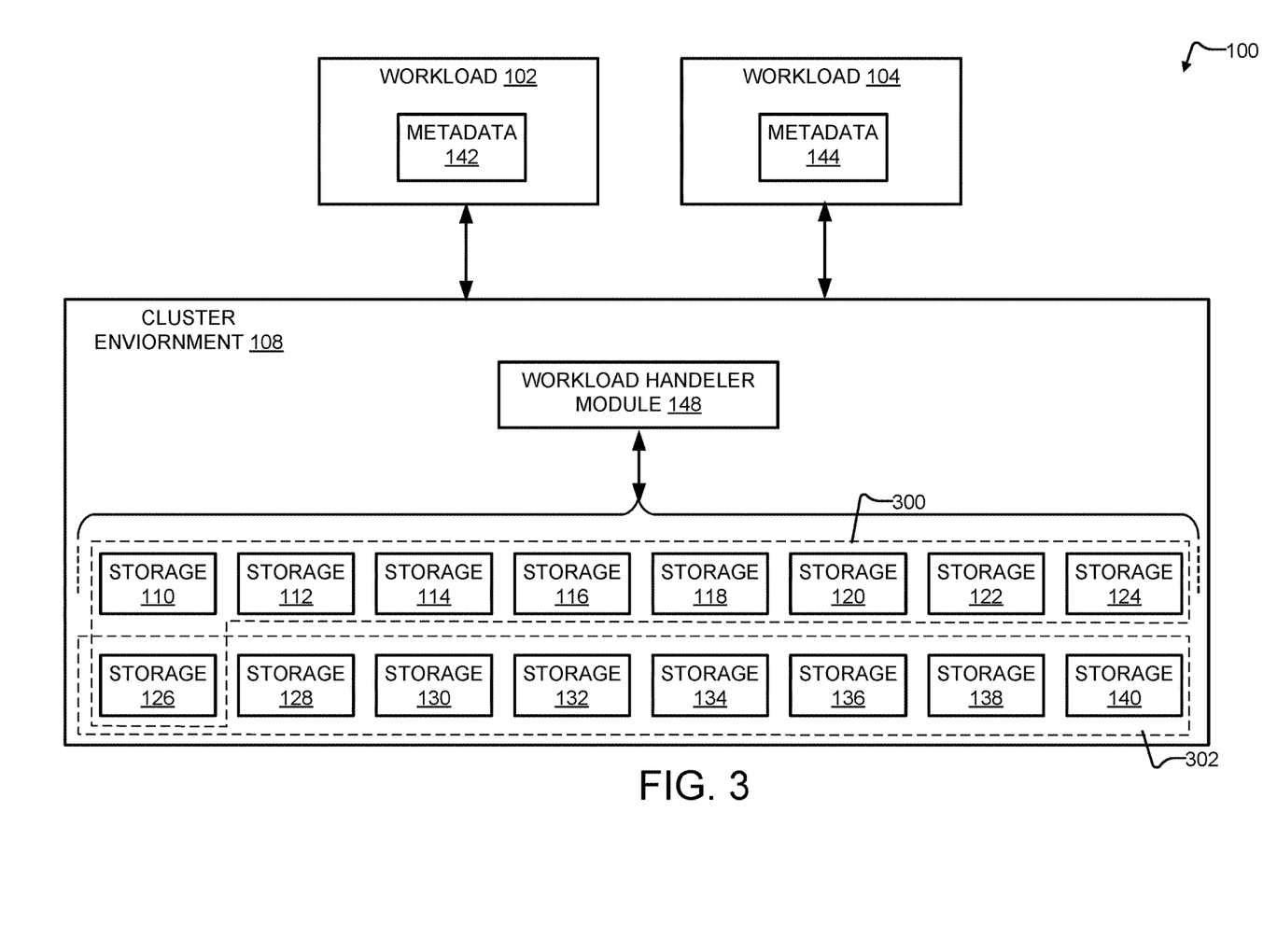
FIG. 3 is a diagram illustrating a dynamic cluster environment configuration, according to the described implementations.

In some implementations, as illustrated in FIG. 3 and shown by dashed line containers 300 and 302, data associated with the workload 102 is spread across the storages 110-126, and data associated with the workload 104 is spread across the storages 126-140. The data associated with the workloads 102 and 104 is mirrored or redundantly stored three times within the cluster environment 108. Specifically, the data associated with the workload 102 is mirrored or redundantly stored three times across the storages 110-126, and the data associated with the workload 104 is mirrored or redundantly stored three times across the storages 126-140. This arrangement provides good performance and space efficiency. Specifically, the failure of three of the storages 110-140 would cause at most one of the workloads 102 or 104 to fail, and at least five of the storages 110-140 would need to fail before a failure of both of the workloads 102 and 104 occurs.

Figure 4:
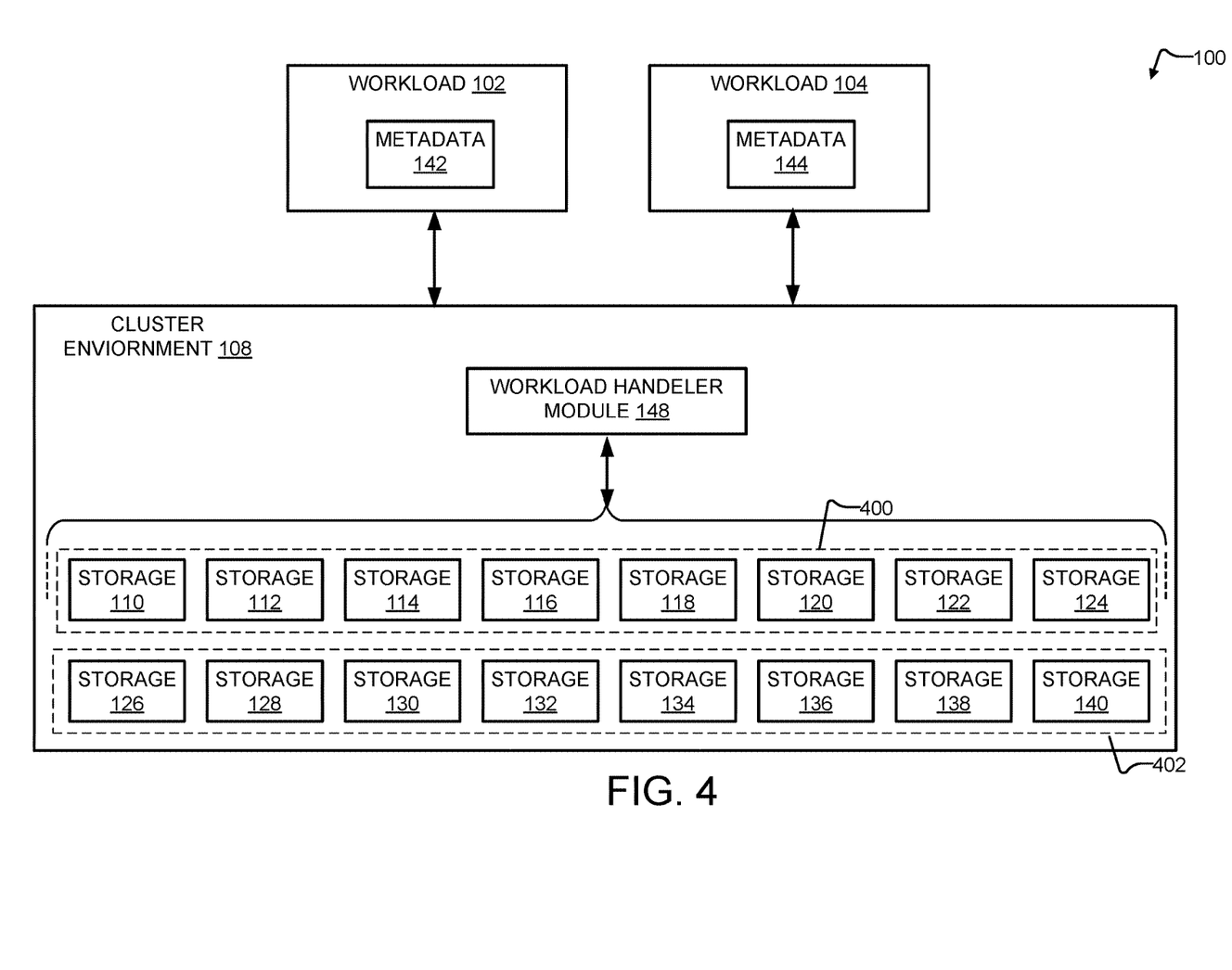
FIG. 4 is a diagram illustrating a dynamic cluster environment configuration, according to the described implementations.

In some implementations, as illustrated in FIG. 4 and shown by dashed line boxes 400 and 402, data associated with the workload 102 is spread across the storages 110-124, and data associated with the workload 104 is spread across the storages 126-140. The data associated with the workloads 102 and 104 is mirrored or redundantly stored three times within the cluster environment 108. Specifically, the data associated with the workload 102 is mirrored or redundantly stored three times across the storages 110-124, and the data associated with the workload 104 is mirrored or redundantly stored three times across the storages 126-140. This arrangement provides good performance and space efficiency. Specifically, the failure of three of the storages 110-140 would cause at most one of the workloads 102 or 104 to fail, and at least six of the storages 110-140 would need to fail before a failure of both of the workloads 102 and 104 occurs.

Figure 5:
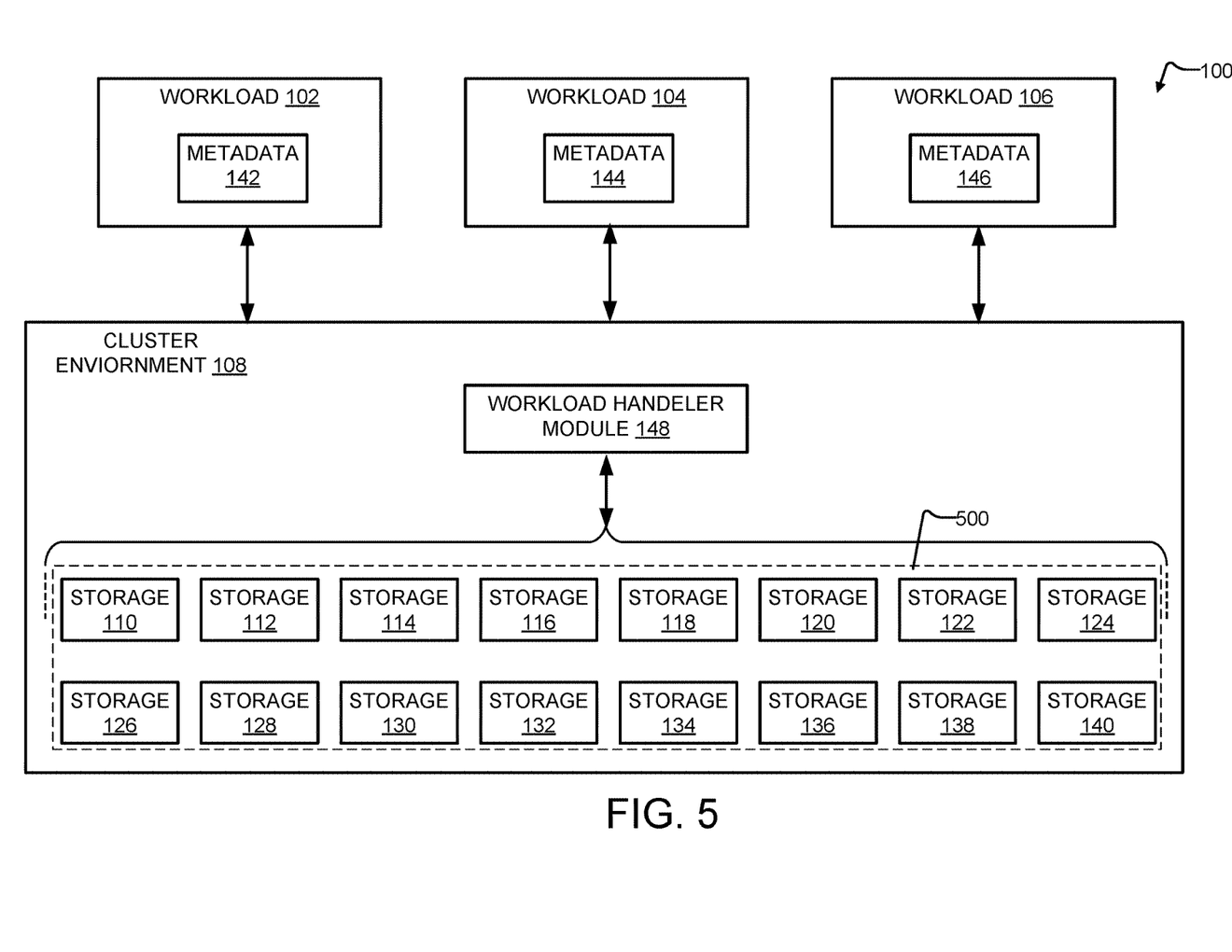
FIG. 5 is a diagram illustrating a dynamic cluster environment configuration, according to the described implementations.

In some implementations, as illustrated in FIG. 5 and shown by dashed line box 500, data associated with the workloads 102-106 is spread across all the storages 110-140. The data associated with the workloads 102-106 is mirrored or redundantly stored three times within the cluster environment 108 and specifically across the storages 110-140. This arrangement provides excellent performance and space efficiency. However, in this arrangement, a failure of at least three of the storages 110-140 will likely cause the failure of each of the workloads 102-106.

Using a similar approach is illustrated in FIG. 3, in some implementations, data associated with the workload 102 is spread across the storages 110-118 and 140, data associated with the workload 104 is spread across the storages 120-128 and 140, and data associated with the workload 106 is spread across the storages 130-140. The data associated with the workloads 102-106 is mirrored or redundantly stored three times within the cluster environment 108. Specifically, the data associated with the workload 102 is mirrored or redundantly stored three times across the storages 110-118 and 140, data associated with the workload 104 is mirrored or redundantly stored three times across the storages 120-128 and 140, and the data associated with the workload 106 is mirrored or redundantly stored three times across the storages 130-140. This arrangement provides good performance and space efficiency. Specifically, the failure of three of the storages 110-140 would cause at most one of the workloads 102, 104 or 106 to fail, and at least five of the storages 110-140 would cause at most two of the workloads 102-106 to fail. At least seven of the storages 110-140 would need to fail before a failure of all the workloads 102-106 occurs.

Using a similar approach as illustrated in FIG. 4, in some implementations, data associated with the workload 102 is spread across the storages 110-118, data associated with the workload 104 is spread across the storages 120-128, and data associated with the workload 106 is spread across the storages 130-140. The data associated with the workloads 102-106 is mirrored or redundantly stored three times within the cluster environment 108. Specifically, the data associated with the workload 102 is mirrored or redundantly stored three times across the storages 110-118, data associated with the workload 104 is mirrored or redundantly stored three times across the storages 120-128, and the data associated with the workload 106 is mirrored or redundantly stored three times across the storages 130-140. This arrangement provides good performance and space efficiency. Specifically, the failure of three of the storages 110-140 would cause at most one of the workloads 102, 104 or 106 to fail, and at least six of the storages 110-140 would cause at most two of the workloads 102-106 to fail. At least nine of the storages 110-140 would need to fail before a failure of all the workloads 102-106 occurs.

In some implementations, the workloads exceed three. For example, there may be ten workloads or more that are processed by the cluster environment 108 and the workload handler module 148. The cluster environment 108 may include any number of storages. The cluster environment 108 may implement a redundancy scheme where data associated with the plurality workloads is mirrored or redundantly stored three times within the cluster environment 108. In some implementations, the plurality of workloads are spread across all of the storages associated with the cluster environment 108. Excellent performance and space efficiency is achieved with this arrangement, but when three storages fail, there is a high likelihood that all of the plurality of workloads will fail.

In some implementations, data associated with a first plurality of workloads is spread across the storages 110-126, and data associated with a second plurality of workloads is spread across the storages 126-140. The data associated with the first and second plurality of workloads is mirrored or redundantly stored three times within the cluster environment 108. Specifically, the data associated with the first plurality of workloads is mirrored or redundantly stored three times across the storages 110-126, and the data associated with the second plurality of workloads is mirrored or redundantly stored three times across the storages 126-140. This arrangement provides good performance and space efficiency. Specifically, the failure of three of the storages 110-140 would cause at most one of first or second plurality of workloads to fail, and at least five of the storages 110-140 would need to fail before a failure of both first and second plurality of workloads occurs.

In some implementations, data associated with a first plurality of workloads is spread across the storages 110-114 and 140, data associated with a second plurality of workloads is spread across storages 116-120 and 140, data associated with a third plurality of workloads is spread across storages 122-126 and 140, data associated with a fourth plurality of workloads is spread across storages 128-132 and 140, and data associated with a fifth plurality of workloads is spread across storages 134-140.

In some implementations, data associated with a first plurality of workloads is spread across the storages 110-114, data associated with a second plurality of workloads is spread across storages 116-120, data associated with a third plurality of workloads is spread across storages 122-126, data associated with a fourth plurality of workloads is spread across storages 128-132, and data associated with a fifth plurality of workloads is spread across storages 134-140.

The implementations described in the foregoing show that the cluster environment 108 and/or the workload handler module 148 provide dynamic workload allocation that balances performance, storage allocation efficiency and survival of workloads in the event of a catastrophic failure across multiple storages.

Hereinafter, a more detailed discussion of the operation of the systems and components described above is provided with reference to a flow diagram. As illustrated FIG. 6, aspects of method 600 related to workload processing and dynamic storage cluster configuration are provided. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the method 200 are described herein as being implemented, at least in part, by system components, which can comprise an application, component and/or a circuit. In some configurations, the system components include a dynamically linked library (DLL), a statically linked library, functionality produced by an application programming interface (API), a compiled program, an interpreted program, a script or any other executable set of instructions. Data, such as the data associated with the workloads 102, 104 and/or 106, can be stored in a data structure in one or more memory components. Data can be retrieved from the data structure by addressing links or references to the data structure.

Although the following illustration refers to the components of FIG. 1-5, it can be appreciated that the operations of the method 600 may be also implemented in many other ways. For example, the method 600 may be implemented, at least in part, by a processor of another remote computer or a local circuit. In addition, one or more of the operations of the method 600 may alternatively or additionally be implemented, at least in part, by a chipset working alone or in conjunction with other software modules. Any service, circuit or application suitable for providing the techniques disclosed herein can be used in operations described herein.

Figure 6:
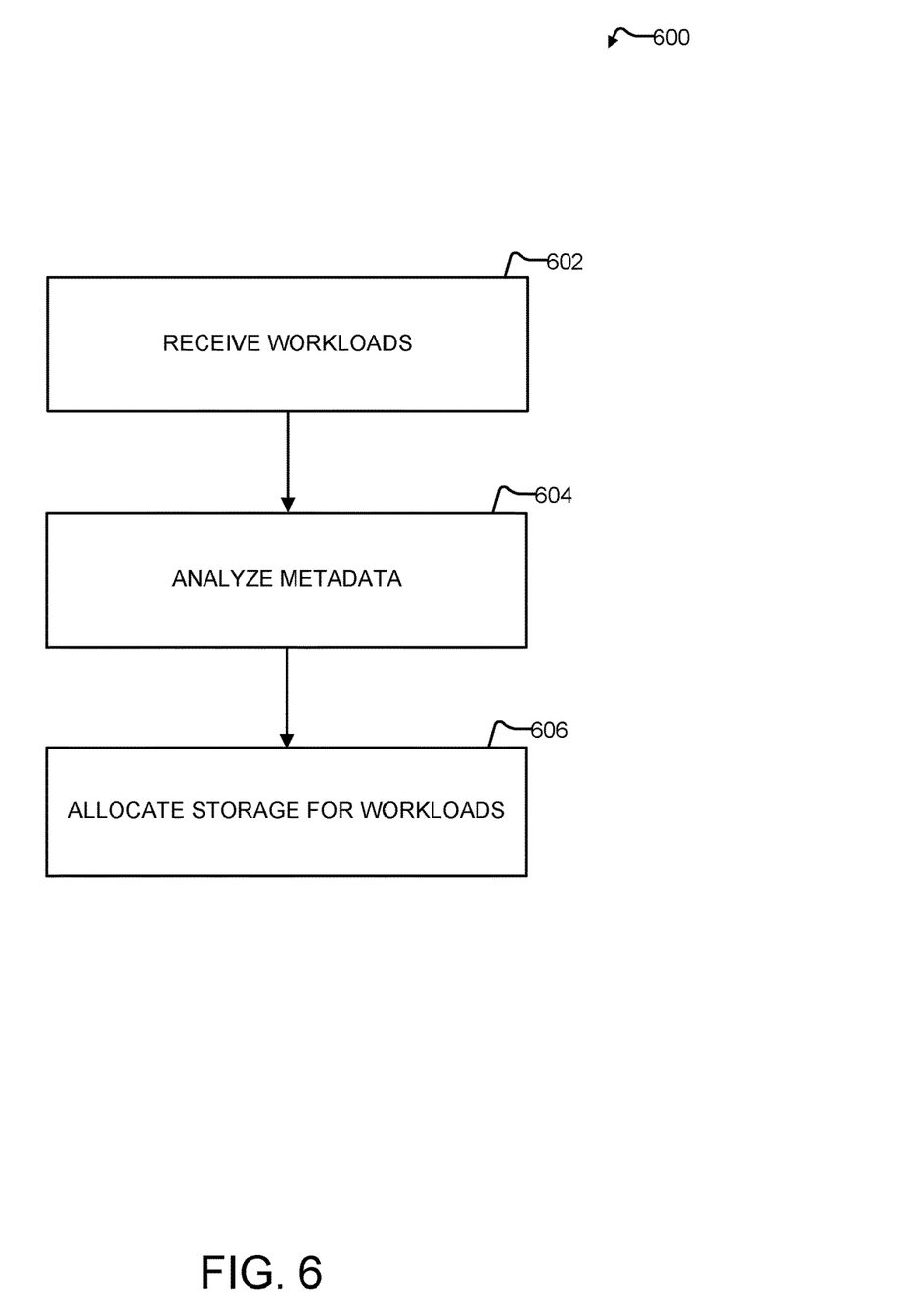
FIG. 6 is a flow diagram of a method of providing dynamic cluster environment configuration, according to the described implementations.

FIG. 6 is a flow diagram of a method 600 of providing dynamic cluster environment configuration, such as in the cluster environment 108, according to the described implementations. Specifically, the method 600 may generally be performed by the operating environment 100 and/or one or more computing devices associated with the operating environment 100. Such computing devices may include computing devices associated with the workloads 102-106, the cluster environment 108, the workload handler module 148 and/or the storages 110-140.

As illustrated in FIG. 6, at block 602, the cluster environment 108 may receive one or more workloads 102, 104 and/or 106. In some implementations, the workload handler module 148 may receive the one or more workloads 102, 104 and/or 106.

At block 604, the workload handler module 148 analyzes metadata (e.g., metadata 142, 144 and/or 146) associated with the one or more workloads 102, 104 and/or 106. In some implementations, in general, the one or more of the workloads 102-106 may be processed by the cluster environment 108.

More specifically, at block 604, the workload handler module 148 may analyze the metadata 142 associated with the workload 102. In some nonlimiting implementations, analysis of the metadata 142 may indicate that a resiliency parameter associated with the metadata 142 specifies that data of the workload 102 is to be mirrored or redundantly stored across at least three disparate storage entities. Furthermore, in some nonlimiting implementations, analysis of the metadata 142 may indicate that a performance parameter associated with the metadata 142 specifies that the data of the workload 102 is to be expedited. Generally, the performance parameter may specify one of a plurality of predetermined processing levels known to the cluster environment 108 and the workload handler module 148, such as predetermined processing levels from high to low. Additionally, in some nonlimiting implementations, analysis of the metadata 142 may indicate a time parameter associated with the metadata 142 specifies that the data of the workload 102 is to be processed by the cluster environment 108 and the workload handler module 148 during nighttime hours, daytime hours, a particular range of hours, or for a particular duration. The workload handler 148 may similarly analyze the metadata 144 associated with the workload 104 and/or analyze the metadata 146 associated with the workload 106. Furthermore, if additional workloads are coupled to or will be coupled to the cluster environment 108, those additional workloads may also be similarly processed by the cluster environment 108 and the workload handler module 148.

At block 606, the workload handler module 148 may use the metadata 142, 144 and/or 146 in determining how many of the storages 110-140 will be allocated to a given workload 102, 104, and/or 106. For example, the workload handler module 148 may analyze the metadata 142 of the workload 102 to determine that the data associated with the workload 102 is to be redundantly stored in three disparate storage entities. Furthermore, analysis of the metadata 142 may indicate that processing of the data associated with the workload 102 is to be performed at a low processing level. Additionally, analysis of the metadata 142 may indicate that the data associated with the workload 102 is to be processed on a daytime schedule (e.g., 6 AM-6 PM). In accordance with the analysis performed by the workload handler module 148, the workload handler module 148 may select, in one example, storages 110-116 to process the data associated with the workload 102. In some implementations, the workload handler module 148 divides the data associated with the workload 102 in order to spread the data consistently, and in accordance with the required redundancy, across the storages 110-116.

In addition to the foregoing, at block 606, the workload handler module 148 may analyze the metadata 144 of the workload 104 to determine that the data associated with the workload 104 is to be redundantly stored in two disparate storage entities. Furthermore, analysis of the metadata 144 may indicate that processing of the data associated with the workload 104 is to be performed at a medium processing level. Additionally, analysis of the metadata 144 may indicate that the data associated with the workload 104 is to be processed on a daytime schedule (e.g., 6 AM-6 PM). In accordance with the analysis performed by the workload handler module 148, the workload handler module 148 may select, in one example, storages 116-124 to process the data associated with the workload 104. In some implementations, the workload handler module 148 divides the data associated with the workload 104 in order to spread the data consistently, and in accordance with the required redundancy, across the storages 116-124.

Similarly, at block 606, the workload handler module 148 may analyze the metadata 146 of the workload 106 to determine that the data associated with the workload 104 is to be redundantly stored in at least four disparate storage entities. Furthermore, analysis of the metadata 146 may indicate that processing of the data associated with the workload 106 is to be performed at a high processing level. Additionally, analysis of the metadata 146 may indicate that the data associated with the workload 106 is to be processed on a nighttime schedule (e.g. 6 PM-6 AM) in accordance with the analysis performed by the workload handler module 148, the workload handler module 148 may select, in one example, storages 126-140 to process the data associated with the workload 106. In some implementations, the workload handler module 148 divides the data associated with the workload 104 in order to spread the data consistently, and in accordance with the required redundancy, across the storages 126-140.

In some implementations, at blocks 604 and 606, the workload handler module 148 may serially analyze metadata associated with the workloads 102, 104, and/or 106 and serially allocate data associated with the workloads 102, 104, and/or 106 to pluralities of the storages 110-140. In some implementations, the workload handler module 148 may parallelly analyze metadata associated with the workloads 102, 104, and/or 106 and may parallelly allocate data associated with the workloads 102, 104, and/or 106 parallelly to pluralities of the storages 110-140.

In some implementations, the cluster environment 108 and the workload handler module 148 may periodically analyze, at block 204, the metadata 142-146 of the workloads 102-106 to ascertain if one or more parameters of the metadata 142-146 has changed or otherwise undergone modification. In some implementations, changes or modifications to the metadata 142-146 and the parameters associated therewith may cause the workload handler module 148 to alter or modify a plurality of the storages 110-140 allocated to one or more the workloads 102-106. Initial and periodic analysis of the metadata 142-146, at block 204, may enable the cluster environment 108 to dynamically allocate pluralities of the storages 110-140 to the workloads 102-106 based on the data processing needs of the workloads 102-106, as defined by the metadata 142-146.

Figure 7:
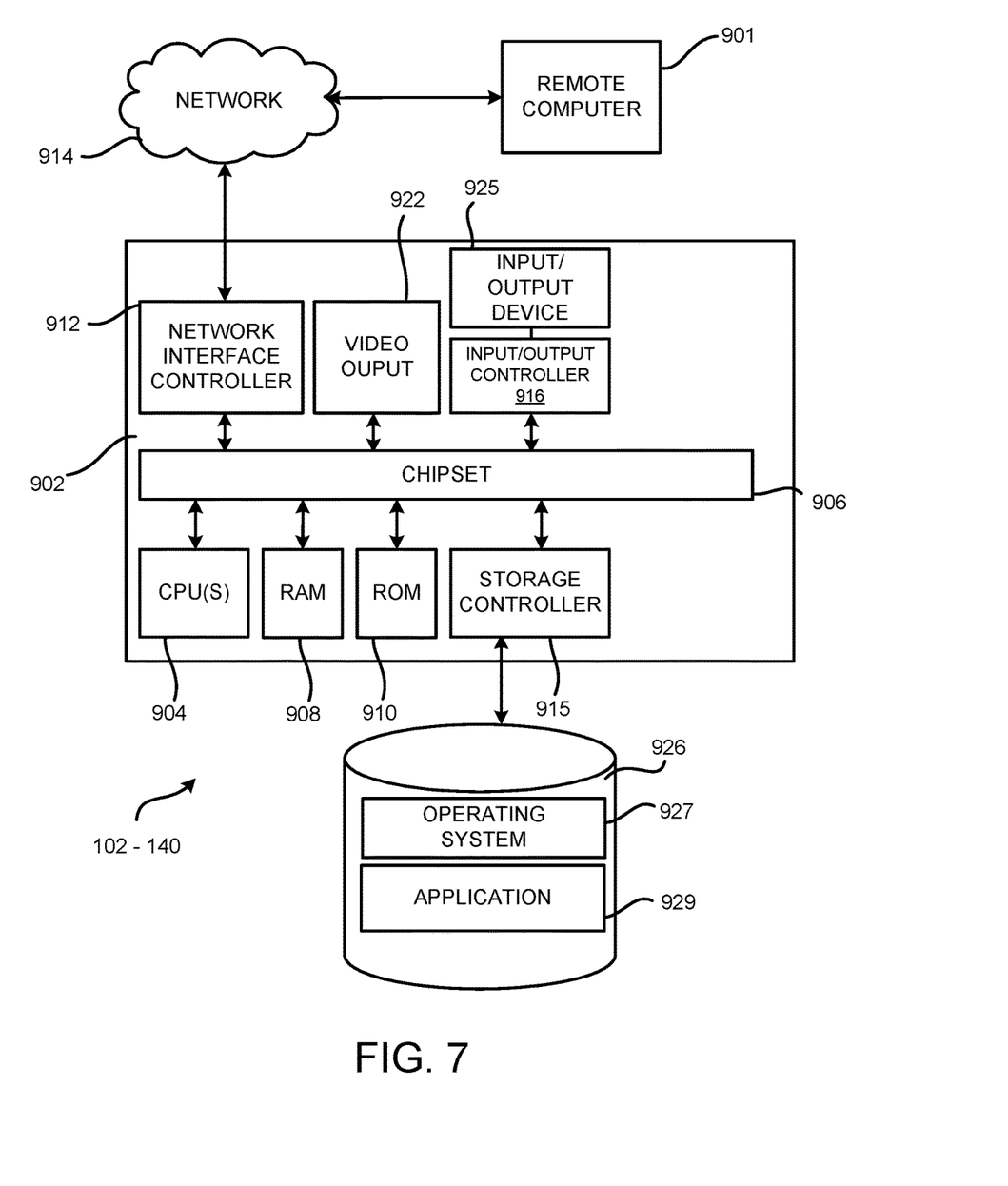
FIG. 7 is a computer architecture diagram illustrating a computing device architecture for a computing device capable of implementing aspects of the techniques and technologies presented herein.

FIG. 7 shows additional details of an example computer architecture for the components shown in FIGS. 1-5, and capable of executing the program components described above. The computer architecture shown in FIG. 7 illustrates aspects of a system, such as a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 7 may be utilized to execute any of the software components described above. Although some of the components described herein are specific to the computing devices 102-140, it can be appreciated that such components, and other components may be part of any suitable remote computer.

The computer architecture includes a baseboard 902, or "motherboard," which is a printed circuit board to which a multitude of components or devices may be connected by way of a system bus or other electrical communication paths. In one illustrative embodiment, one or more central processing units ("CPUs") 904 operate in conjunction with a chipset 906. The CPUs 904 may be standard programmable processors that perform arithmetic and logical operations necessary for the operation of the computer architecture.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a RAM 908, used as the main memory in the computer architecture. The chipset 906 may further provide an interface to a computer-readable storage medium such as a read-only memory ("ROM") 910 or non-volatile RAM ("NVRAM") for storing basic routines that help to startup the computing device 101 and to transfer information between the various components and devices. The ROM 610 or NVRAM may also store other software components necessary for the operation of the computer architecture in accordance with the embodiments described herein.

The computer architecture may operate in a networked environment using logical connections to remote computing devices and computer systems through a network 914, such as the local area network. The chipset 906 may include functionality for providing network connectivity through a network interface controller (NIC) 912, such as a gigabit Ethernet adapter. The NIC 912 is capable of connecting the computer architecture to other computing devices over the network 914. It should be appreciated that multiple NICs 912 may be present in the computer architecture, connecting the computer to other types of networks and remote computer systems. The network allows the computer architecture to communicate with remote services and servers, such as the remote computer 901. As can be appreciated, the remote computer 901 may host a number of services such as the XBOX LIVE gaming service provided by MICROSOFT CORPORATION of Redmond, Wash. In addition, as described above, the remote computer 901 may mirror and reflect data stored on the computer architecture and host services that may provide data or processing for the techniques described herein.

The computer architecture may be connected to a mass storage device 926 that provides non-volatile storage for the computing device. The mass storage device 926 may store system programs, application programs, other program modules, and data, which have been described in greater detail herein. The mass storage device 926 may be connected to the computer architecture through a storage controller 915 connected to the chipset 906. The mass storage device 926 may consist of one or more physical storage units. The storage controller 915 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 926, other storage media and the storage controller 915 may include MultiMediaCard (MMC) components, eMMC components, Secure Digital (SD) components, PCI Express components, or the like.

The computer architecture may store data on the mass storage device 926 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 926 is characterized as primary or secondary storage, and the like.

For example, the computer architecture may store information to the mass storage device 926 by issuing instructions through the storage controller 915 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture may further read information from the mass storage device 926 by detecting the physical states or characteristics of one or more particular locations within the physical storage units.

In addition to the mass storage device 926 described above, the computer architecture may have access to other computer-readable media to store and retrieve information, such as program modules, data structures, or other data. Thus, the application 929, other data and other modules are depicted as data and software stored in the mass storage device 926, it should be appreciated that these components and/or other modules may be stored, at least in part, in other computer-readable storage media of the computer architecture. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer architecture. For purposes of the claims, the phrase "computer storage medium," "computer-readable storage medium," and variations thereof, does not include waves or signals per se and/or communication media.

The mass storage device 926 may store an operating system 927 utilized to control the operation of the computer architecture. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 926 may store other system or application programs and data utilized by the computer architecture, such as any of the other software components and data described above. The mass storage device 926 might also store other programs and data not specifically identified herein.

In one embodiment, the mass storage device 926 or other computer-readable storage media is encoded with computer-executable instructions which, when loaded into the computer architecture, transform the computer from a general-purpose computing system into a special-purpose computer capable of implementing the embodiments described herein. These computer-executable instructions transform the computer architecture by specifying how the CPUs 904 transition between states, as described above. According to one embodiment, the computer architecture has access to computer-readable storage media storing computer-executable instructions which, when executed by the computer architecture, perform the various routines described above with regard to FIG. 9, and the other FIGURES. The computing device might also include computer-readable storage media for performing any of the other computer-implemented operations described herein.

The computer architecture may also include one or more input/output controllers 916 for receiving and processing input from a number of input devices, such as a keyboard, a mouse, a microphone, a headset, a touchpad, a touch screen, an electronic stylus, or any other type of input device. Also shown, the input/output controller 916 is in communication with an input/output device 925. The input/output controller 916 may provide output to a display, such as a computer monitor, a flat-panel display, a digital projector, a printer, a plotter, or other type of output device. The input/output controller 916 may provide input communication with other devices such as a microphone, a speaker, game controllers and/or audio devices.

For example, the input/output controller 916 can be an encoder and the output device 925 can include a full speaker system having a plurality of speakers. The encoder can use a spatialization technology, and the encoder can process audio output audio or output signals received from the application 929. The encoder can utilize a selected spatialization technology to generate a spatially encoded stream that appropriately renders to the output device 925.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device, comprising:
   a processor;
   a memory having computer-executable instructions stored thereupon which, when executed by the processor, cause the computing device to
   receive a first workload and a second workload, a first metadata included in the first workload and a second metadata included in the second workload;
   analyze the first metadata included in the first workload and the second metadata included in the second workload;
   allocate data of the first workload to a first plurality of storage devices at least based on the first metadata included in the first workload;
   allocate data of the second workload to a second plurality of storage devices at least based on the second metadata included in the second workload; and
   dynamically allocate the data of the first workload to another plurality of storage devices at least based on a change in the first metadata included in the first workload,
   wherein the data of the first workload and the data of the second workload are allocated to at least one shared storage based on the analysis of at least one of the first metadata and the second metadata.

2. The computing device according to claim 1, wherein the first metadata includes at least a resiliency parameter associated with the first workload and the second metadata includes at least a resiliency parameter associated with the second workload, and wherein the data of the first workload and the data of the second workload are allocated to the at least one shared storage based on analysis of the resiliency parameter associated with the first workload and the resiliency parameter associated with the second workload.

3. The computing device according to claim 1, wherein the first metadata includes at least a performance parameter associated with the first workload and the second metadata includes at least a performance parameter associated with the second workload.

4. The computing device according to claim 1, wherein at least one storage device is common among at least a plurality of the first plurality of storage devices, the second plurality of storage devices, and the another plurality of storage devices.

5. The computing device according to claim 1, wherein the memory having computer-executable instructions stored thereupon which, when executed by the processor, cause the computing device to dynamically allocate the data of the second workload to another plurality of storage devices at least based on a change in the second metadata included in the second workload.

6. The computing device according to claim 1, wherein the first and second plurality of storage devices are associated with a fault domain, each of the first and second plurality of storage devices associated with the fault domain usable to store the data associated with at least the first and second workloads.

7. The computing device according to claim 1, wherein the memory having computer-executable instructions stored thereupon which, when executed by the processor, cause the computing device to periodically analyze the first metadata included in the first workload and the second metadata included in the second workload to determine if the first metadata and the second metadata have changed.

8. A non-transitory computer readable medium having stored thereon software instructions that, when executed by a computer, cause the computer to perform operations comprising:
receiving a first workload and a second workload, a first metadata included in the first workload and a second metadata included in the second workload;
analyzing the first metadata included in the first workload and the second metadata included in the second workload;
allocating data of the first workload to a first plurality of storage devices at least based on the first metadata included in the first workload;
allocating data of the second workload to a second plurality of storage devices at least based on the second metadata included in the second workload; and
dynamically allocating the data of the first workload to another plurality of storage devices at least based on a change in the first metadata included in the first workload,
wherein the data of the first workload and the data of the second workload are allocated to at least one shared storage based on the analysis of at least one of the first metadata and the second metadata.

9. The non-transitory computer readable medium according to claim 8, wherein the first metadata includes at least a resiliency parameter associated with the first workload and the second metadata includes at least a resiliency parameter associated with the second workload, and wherein the data of the first workload and the data of the second workload are allocated to the at least one shared storage based on analysis of the resiliency parameter associated with the first workload and the resiliency parameter associated with the second workload.

10. The non-transitory computer readable medium according to claim 8, wherein the first metadata includes at least a performance parameter associated with the first workload and the second metadata includes at least a performance parameter associated with the second workload.

11. The non-transitory computer readable medium according to claim 8, wherein at least one storage device is common among at least a plurality of the first plurality of storage devices, the second plurality of storage devices, and the another plurality of storage devices.

12. The non-transitory computer readable medium according to claim 8, comprising dynamically allocating the data of the second workload to another plurality of storage devices at least based on a change in the second metadata associated with the second workload.

13. The non-transitory computer readable medium according to claim 8, wherein the first and second plurality of storage devices are associated with a fault domain, each of the first and second plurality of storage devices associated with the fault domain usable to store data associated with at least the first and second workloads.

14. A computing device, comprising:
a processor;
a memory having computer-executable instructions stored thereupon which, when executed by the processor, cause the computing device to
receive a first workload that includes a first metadata;
analyze the first metadata included in the first workload, the first metadata including at least one handling parameter for use in allocating data of the first workload to a plurality of storage devices;
allocate the data of the first workload to a first plurality of storage devices at least based on the first metadata included in the first workload; and
dynamically allocating the data of the first workload to another plurality of storage devices at least based on a change in the first metadata included in the first workload.

15. The computing device according to claim 14, wherein the first metadata includes at least a resiliency parameter associated with the first workload, the resiliency parameter identifying a number of redundant copies of the data of the first workload is to be stored.

16. The computing device according to claim 14, wherein the first metadata includes at least a performance parameter associated with the first workload.

17. The computing device according to claim 14, wherein the computer executable-instructions, when executed by the processor, cause the computing device to
analyze second metadata included in a second workload,
allocate data of the second workload to a second plurality of storage devices at least based on the second metadata included in the second workload, at least one of the storage devices in the second plurality of storage devices being likewise in the first plurality of storage devices.

18. The computing device according to claim 14, wherein the first plurality of storage devices comprises one or more of a hard drive, a solid-state storage device, and a physical storage unit.

19. The computing device according to claim 14, wherein the first metadata includes a resiliency parameter specifying an amount of storage redundancy to be allocated to the data of the first workload.

20. The computing device according to claim 14, wherein the first workload comprises at least a plurality of partitioned data, each of the plurality of partitioned data for storage on a plurality of the first plurality of storage devices.

* * * * *